(12) United States Patent
Kim et al.

(10) Patent No.: US 7,551,596 B2
(45) Date of Patent: Jun. 23, 2009

(54) METHOD AND APPARATUS FOR SIGNALING CONTROL INFORMATION OF UPLINK PACKET DATA SERVICE IN MOBILE COMMUNICATION SYSTEM

(75) Inventors: Soeng-Hun Kim, Suwon-si (KR); Gert Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 11/269,886

(22) Filed: Nov. 9, 2005

(65) Prior Publication Data

US 2006/0165045 A1 Jul. 27, 2006

(30) Foreign Application Priority Data

| Nov. 9, 2004 | (KR) | ........................ 10-2004-0091093 |
| Dec. 21, 2004 | (KR) | ........................ 10-2004-0109938 |

(51) Int. Cl.
*H04J 3/24* (2006.01)

(52) U.S. Cl. ........................ 370/349; 370/338; 370/335; 370/469; 370/346; 370/310; 370/389

(58) Field of Classification Search ................. 370/349, 370/389, 469, 335–336, 395.1, 278, 346, 370/442, 328, 338; 455/436, 403, 422.1, 455/445, 428, 560, 550.1, 517; 714/746–771
See application file for complete search history.

(56) References Cited

U.S. PATENT DOCUMENTS 6,643,813 B1 * 11/2003 Johansson et al. ............ 714/748

(Continued)

FOREIGN PATENT DOCUMENTS

KR 1020030017279 A 3/2003

(Continued)

OTHER PUBLICATIONS

Dimou et al., "MAC Scheduling for Uplink Transmission in UMTS WCDMA", Vehicular Technology Conference, May 6-9, 2001, pp. 2625-2629, vol. 4, IEEE.

(Continued)

*Primary Examiner*—Kamran Afshar
(74) *Attorney, Agent, or Firm*—Roylance, Abrams, Berdo & Goodman, L.L.P.

(57) ABSTRACT

A method and apparatus for transmitting control information relating to an uplink packet data service from a user equipment (UE) to a Node B in a mobile communication system are provided. MAC-es protocol data units (PDUS) including data of an upper layer and a control service data unit (SDU) including control information of a MAC layer are multiplexed and contained in a MAC-e protocol data unit (PDU) transmitted in an uplink from the UE during one transmission period. In a header of the MAC-e PDU, a header part corresponding the control SDU contains a data description indicator (DDI) field set as a specific value representing that the control information is transmitted, and a header part corresponding to the MAC-es PDU contains a DDI field which represents a MAC-e flow and a logical channel relating to uplink packet data included in the second PDU, and a data size. Node B detects the control information from the control SDU based on the DDI field set as the specific value. Since the header part representing the control information has a structure similar to the header part representing the MAC-es PDU, the structure of the header is simplified, and the header size of the packet is minimized.

24 Claims, 15 Drawing Sheets

U.S. PATENT DOCUMENTS

| | | | |
|---|---|---|---|
| 7,391,758 B2* | 6/2008 | Matusz | 370/349 |
| 2002/0174276 A1* | 11/2002 | Jiang | 710/105 |
| 2002/0196760 A1* | 12/2002 | Malomsoky et al. | 370/338 |
| 2003/0210669 A1* | 11/2003 | Vayanos et al. | 370/335 |
| 2005/0111451 A1* | 5/2005 | Kim | 370/389 |
| 2005/0174985 A1* | 8/2005 | Lee et al. | 370/349 |
| 2005/0201378 A1* | 9/2005 | Ludwig et al. | 370/395.1 |
| 2005/0227695 A1* | 10/2005 | Rasanen et al. | 455/436 |
| 2006/0013268 A1* | 1/2006 | Terry | 370/537 |
| 2006/0067364 A1* | 3/2006 | Jung et al. | 370/469 |
| 2006/0146761 A1* | 7/2006 | Kim et al. | 370/335 |
| 2006/0209896 A1* | 9/2006 | Choi et al. | 370/469 |
| 2006/0251105 A1* | 11/2006 | Kim et al. | 370/449 |

FOREIGN PATENT DOCUMENTS

KR    1020030067556 A    8/2003

OTHER PUBLICATIONS

Bertinelli et al., "HARQ For WCDMA Enhanced Uplink: Link Level Performance in SHO", International Symposium, Sep. 5-8, 2004, pp. 2856-2860, vol. 4, IEEE.

Dimous, K. et al., "MAC Scheduling for Uplink Transmission in UMTS WCDMA," IEEE, 2001, France.

* cited by examiner

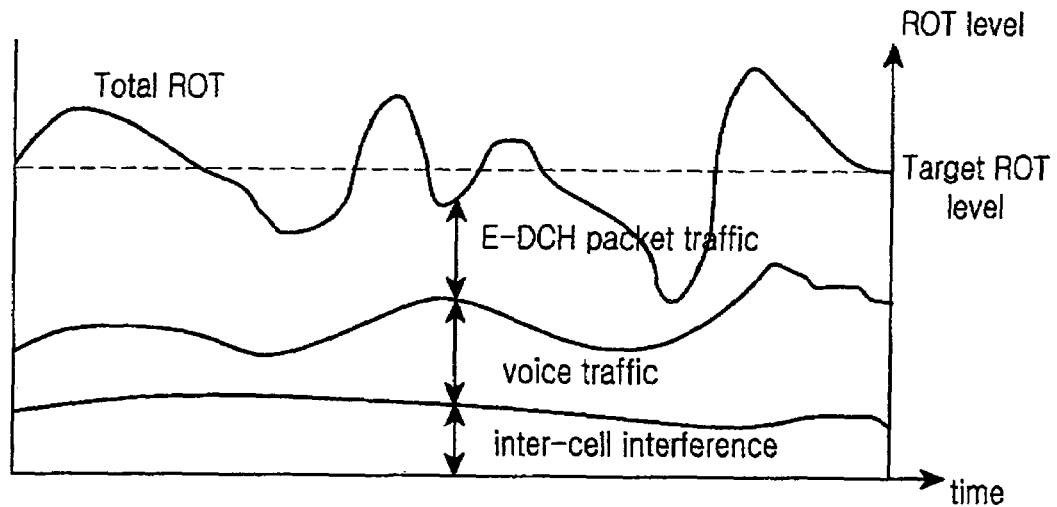
FIG.1A
(CONVENTIONAL)
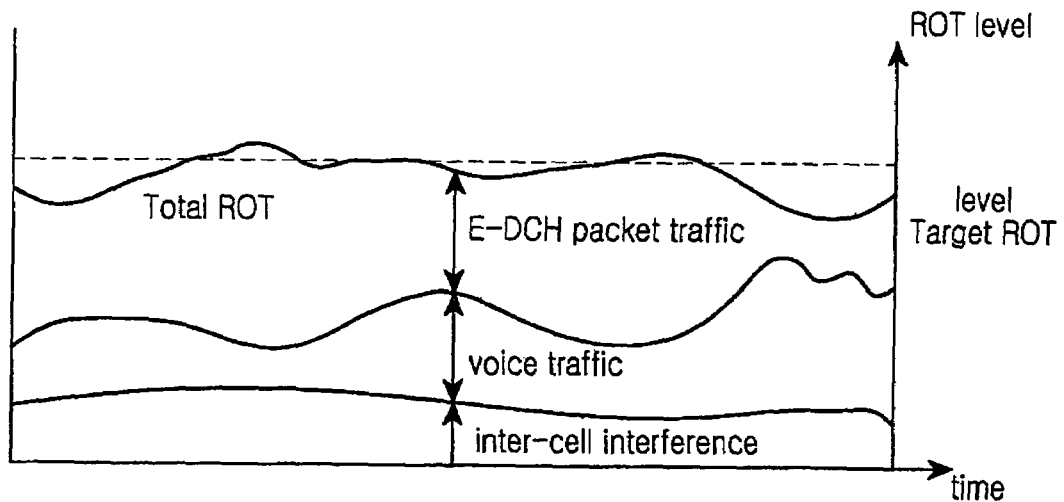
FIG.1B
(CONVENTIONAL)

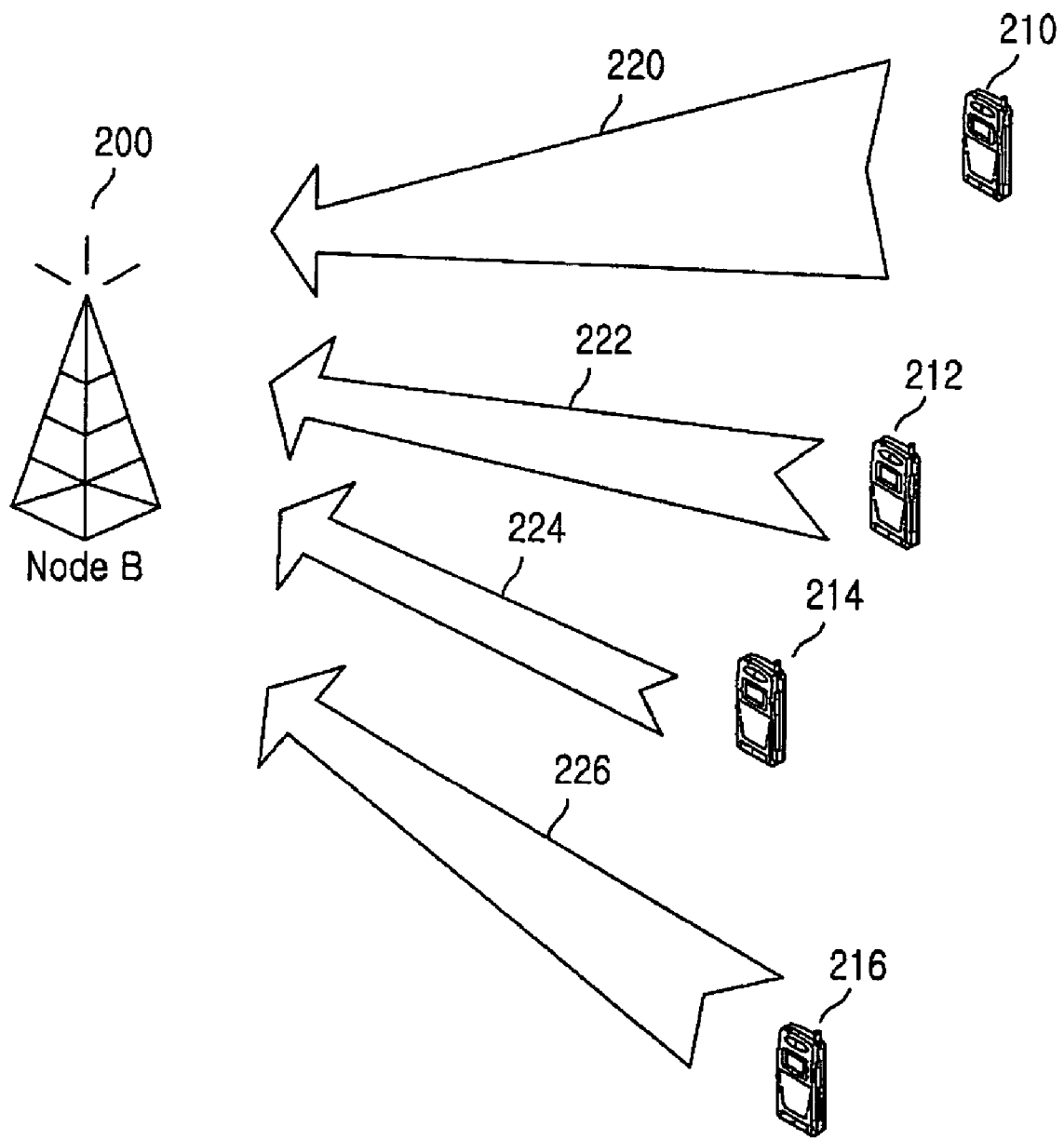
FIG.2
(CONVENTIONAL)

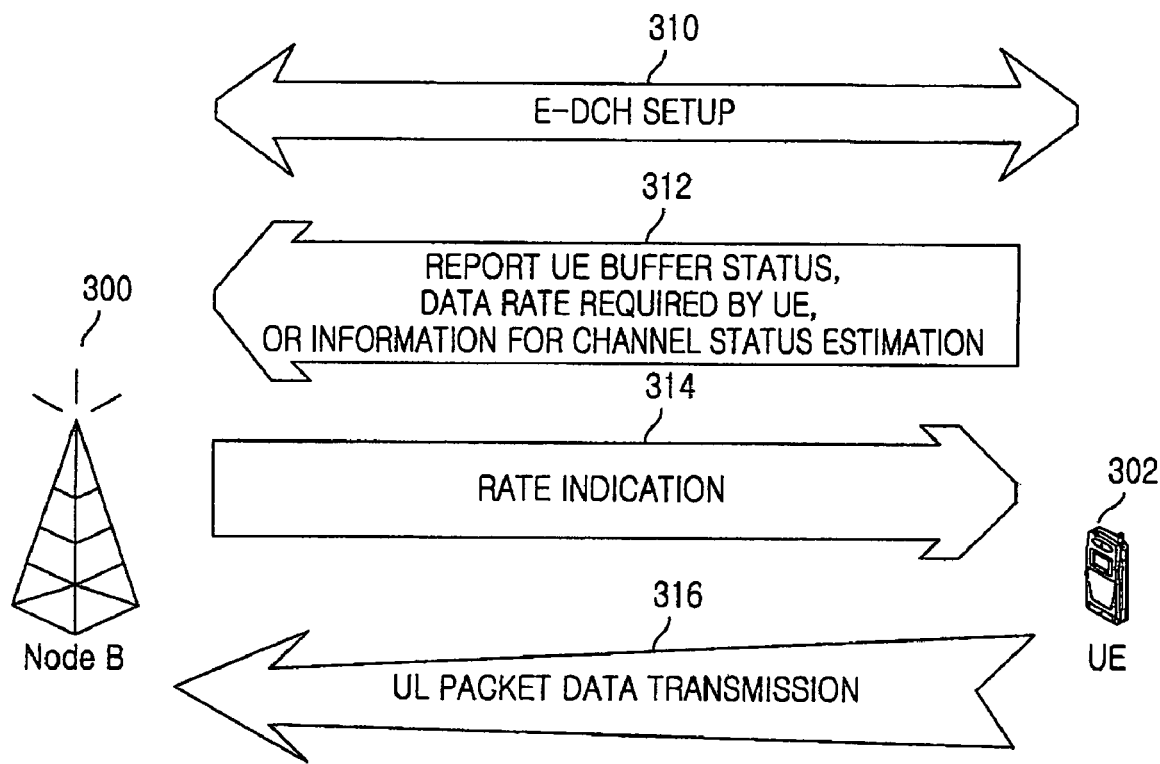
FIG.3
(CONVENTIONAL)

METHOD AND APPARATUS FOR SIGNALING CONTROL INFORMATION OF UPLINK PACKET DATA SERVICE IN MOBILE COMMUNICATION SYSTEM

PRIORITY

This application claims the benefit under 35 U.S.C. 119(a) of Korean Patent Applications Serial Nos. 2004-91093 and 2004-109938, filed in the Korean Intellectual Property Office on Nov. 9, 2004 and Dec. 21, 2004, respectively, the entire contents of which are hereby incorporated by reference.

BACKGROUND OF THE INVENTION

1. Field of the Invention

The present invention relates to a mobile communication system for transmitting packet data in uplink. More particularly, the present invention relates to a method and apparatus for efficiently signaling control information which is used to control an uplink packet data service.

2. Description of the Related Art

A European-type $3^{rd}$ generation mobile communication system, which is based on Global System for Mobile communication (GSM) and General Packet Radio Services (GPRS) and uses an asynchronous wideband code division multiple access (WCDMA), utilizes an enhanced uplink dedicated channel (E-DCH or EUDCH). The E-DCH has been proposed to improve the packet transmission performance in uplink communication of the asynchronous WCDMA communication system.

A mobile communication system supporting the E-DCH employs a Node B controlled scheduling scheme and a hybrid automatic retransmission request (HARQ) scheme in order to maximize the effectiveness of uplink transmission. According to the Node B controlled scheduling scheme, the statuses of the channels and the buffers of user equipments (UEs) are reported to a Node B, and then the Node B controls uplink transmissions of the UEs based on the reported information. The Node B allows a great amount of data to be transmitted to UEs having a good channel status, and minimizes the amount of data to be transmitted to UEs having a bad channel status, in order to efficiently utilize limited uplink transmission resources. According to the HARQ scheme, when an error occurs in a packet transmitted from a UE to a Node B, the packet is retransmitted in order to compensate for the error of the packet, thereby increasing the successful transmission rate as a function of transmission power. Through the HARQ scheme, a Node B does not discard a data block, in which an error has occurred during transmission of the data block, and soft-combines the data block having the error with a retransmitted data block, thereby increasing the probability of successfully receiving data blocks.

In an uplink, since orthogonality is not maintained between signals transmitted from a plurality of UEs, the uplink signals interfere with each other. As a Node B receives more uplink signals, interference with an uplink signal from a specific UE increases, thereby degrading the reception performance of the Node B. For this reason, the Node B restricts the number of uplink signals which can be received with its entire reception performance ensured. The radio resource of a Node B is expressed as shown in equation (1).

$$Rot = I_o / N_o \qquad (1)$$

Herein, "$I_o$" represents the total receiving wideband power spectral density of the Node B, and "$N_o$" represents the thermal-noise power spectral density of the Node B. Therefore, "ROT" represents uplink radio resources which the Node B can allocate for the E-DCH packet data service in an uplink.

FIGS. 1A and 1B are graphs illustrating changes in uplink radio resources which Node B is able to allocate.

As shown in FIGS. 1A and 1B, the uplink radio resources may be expressed as the sum of inter-cell interference (ICI), voice traffic, and E-DCH packet traffic. More specifically, FIG. 1A illustrates changes in the total ROT when the Node B-controlled scheduling is not used. In this case in which a scheduling for the E-DCH packet traffic is not performed, if a plurality of UEs may simultaneously transmit packet data at high data rates, the total ROT may exceed a target ROT, which degrades the reception performance of the uplink signals.

FIG 1B illustrates changes in the total ROT when the Node B-controlled scheduling is used. In this case of using the Node B-controlled scheduling, the Node B prevents a plurality of UEs from simultaneously transmitting packet data at high data rates. That is, according to the Node B-controlled scheduling, when a high data rate is allowed for a specific UE, low rates are allowed for other UEs, thereby preventing the total ROT from exceeding the target ROT.

As the data rate of a UE becomes higher, the Node B receives higher reception power from the UE, so that the ROT of the UE occupies more part of the total ROT of the Node B. In contrast, as the data rate of a UE becomes lower, the Node B receives lower reception power from the UE, so that the ROT of the UE occupies a smaller part of the total ROT of the Node B. The Node B performs the Node B-controlled scheduling for the E-DCH packet data, in consideration of the relationship between the data rate and radio resources and a data rate requested by the UE.

The Node B notifies each UE whether or not E-DCH data can be transmitted based on data rates requested from UEs using the E-DCH or based on channel status information, or performs the Node B-controlled scheduling to adjust the E-DCH data rates. The Node B-controlled scheduling is regarded as an operation that the Node B distributes the ROT to multiple UEs based on the statuses of the channels and the buffers of UEs performing E-DCH communication.

FIG. 2 illustrates a Node B and UEs which performs uplink packet transmission.

UEs 210, 212, 214, and 216 transmits uplink packet data at different uplink-channel transmission power levels 220, 222, 224, 226 according to the distances between them and a Node B 200. The farthest UE 210 transmits packet data at the highest uplink-channel transmission power level 220, while the nearest UE 214 transmits packet data at the lowest uplink-channel transmission power level 224. The Node B 200 may schedule uplink data in a manner that makes the transmission power of the uplink channel inversely proportional to the data rate thereof in order to improve the performance of the mobile communication system, while maintaining the total ROT and reducing ICI. Therefore, the Node B 200 allocates relatively fewer transmission resources to the UE 210 having the highest uplink-channel transmission power, and allocates relatively more transmission resources to the UE 214 having the lowest uplink-channel transmission power, thereby efficiently managing the total ROT.

FIG. 3 is a view for illustrating a procedure in which a UE is allocated from a Node B with a transmission resource for transmission of E-DCH packet data, and transmits the packet data by using the allocated transmission resource.

An E-DCH is established between a Node B 300 and a UE 302 in step 310. Step 310 includes a step of transmitting/receiving messages through a dedicated transport channel. In step 312, the UE 302 transmits information about required transmission resources and scheduling information about an uplink channel status to the Node B 300. The scheduling information includes information about the uplink transmission power and transmission power margin of the UE 302, and buffer status.

The Node B 300 having received the information estimates the uplink channel status by comparing the uplink-channel transmission power with an actually-measured reception power. If the difference between the uplink-channel transmission power and the uplink-channel reception power is small, the uplink channel status is good. In contrast, if the difference between the transmission power and the reception power is large, the uplink channel status is bad. When the UE 302 transmits the transmission power margin, the Node B 300 estimates the uplink transmission power by subtracting the transmission power margin from a known maximum available transmission power of the UE 302. The Node B 300 determines an available transmission resource for an uplink packet channel of the UE 302, based on the estimated uplink transmission power of the UE 302 and information about the buffer status of the UE 302.

In step 314, the Node B 300 notifies the UE 302 of the determined transmission resource. In this case, the transmission resource may be the size of data which can be transmitted, that is, a data rate, or may be an available transmission power. The UE 302 determines the size of packet data to be transmitted through the reported transmission resource, and transmits data of the determined size to the Node B 300 in step 316. In this case, one unit of the packet data transmitted through an E-DCH is called a Media Access Control-enhanced Protocol Data Unit (MAC-e PDU).

As described above, buffer status information, and so on, required for providing an uplink packet data service through an E-DCH is essential control information for an efficient scheduling of a Node B. A protocol for transmitting/receiving control information as described above between a UE and a Node B is called a Medium Access Control for E-DCH (MAC-e). For this reason, the control information is called "MAC-e control information". Therefore, a detailed method for more efficiently signaling the MAC-e control information has been required.

SUMMARY OF THE INVENTION

Accordingly, the present invention has been made to address the above-mentioned problems occurring in the prior art. The present invention provides a method and apparatus for transmitting/receiving MAC-e control information as a part of a MAC-e PDU in a mobile communication system which supports an uplink packet data service.

In accordance with one aspect of the present invention, there is provided a method for transmitting control information for an uplink packet data service in a mobile communication system, the method comprising forming at least one first protocol data unit (PDU) comprising uplink packet data, forming a control service data unit (SDU) comprising control information for an uplink packet data service, forming at least one first header part corresponding to the first PDU by using a data description indicator (DDI) field representing the first PDU and an N field representing a number of uplink packet data included in the first PDU, forming a second header part corresponding to the control SDU by using a DDI field set as a predetermined value indicative of the control SDU be transmitted, and forming a second data packet unit (PDU) by concatenating a header and a payload, and transmitting the second PDU to a Node B, wherein the header comprises the header parts, and the payload comprises the first PDU and the control SDU.

In accordance with another aspect of the present invention, there is provided a method for receiving control information for an uplink packet data service in a mobile communication system, the method comprising receiving a first protocol data unit (PDU) formed by using a header and a payload, demultiplexing the payload into a plurality data units, based on header parts included in the header, dividing the data units into at least one second PDU comprising uplink packet data and a control service data unit (SDU) comprising control information for an uplink packet data service, based on data description indicator (DDI) fields of the header parts corresponding to the data units, wherein a DDI field of a header part corresponding to the control SDU has been set to a predetermined value, and acquiring the control information from the control SDU.

In accordance with still another aspect of the present invention, there is provided a user equipment (UE) for transmitting control information for an uplink packet data service in a mobile communication system, the UE comprising at least one block for forming at least one first protocol data unit (PDU) comprising uplink packet data, a control unit for forming a control service data unit (SDU) comprising control information for an uplink packet data service, and a multiplexing and transmission sequence number (TSN) setting unit for forming at least one first header part corresponding to the first PDU by using a data description indicator (DDI) field representing the first PDU and an N field representing the number of uplink packet data included in the first PDU. The multiplexing and TSN setting unit forms a second header part corresponding to the control SDU by using a DDI field set to a predetermined value indicative of the control SDU being transmitted, and forms a second data packet unit (PDU) by concatenating a header and a payload, the header comprising the header parts, the payload comprising the first PDU and the control SDU, wherein the second PDU is transmitted to a Node B.

In accordance with still another aspect of the present invention, there is provided a Node B for receiving control information for an uplink packet data service in a mobile communication system, the Node B comprising a demultiplexing unit for receiving a first protocol data unit (PDU) comprising a header and a payload, demultiplexing the payload into a plurality data units based on header parts of the header, and dividing the data units into at least one second PDU and a control service data unit (SDU) based on data description indicator (DDI) fields of the header parts corresponding to the data units, the second PDU comprising uplink packet data, the control SDU comprising control information for an uplink packet data service, wherein a DDI field of a header part corresponding to the control SDU has been set to a predetermined value, and a control unit for acquiring the control information from the control SDU.

BRIEF DESCRIPTION OF THE DRAWINGS

The above and other exemplary objects, features and advantages of the present invention will be more apparent from the following detailed description taken in conjunction with the accompanying drawings, in which like reference numerals will be understood to refer to like parts, components and structures, where:

FIG. 1A is a graph illustrates changes in uplink radio resources of a Node B when the Node B-controlled scheduling is not used;

FIG. 1B is a graph illustrates changes in uplink radio resources of a Node B when the Node B-controlled scheduling is used;

FIG. 2 illustrates a Node B and UEs which perform uplink packet transmission;

FIG. 3 is a view for illustrating information transmitted/received between a UE and a Node B in order to perform uplink packet transmission;

DETAILED DESCRIPTION OF EXEMPLARY EMBODIMENT

Hereinafter, exemplary embodiments of the present invention will be described with reference to the accompanying drawings. In the following description of the embodiments of the present invention, a detailed description of known functions and configurations incorporated herein will be omitted for conciseness.

One of the characteristic of the present invention described below is transmitting/receiving control information for an uplink packet data service as a part of uplink packet data in a mobile communication system which supports the uplink packet data service. In the following description, the uplink packet data service will be explained by using an enhanced uplink dedicated channel (E-DCH) for a universal mobile telecommunication service (UMTS) which is a $3^{rd}$ generation mobile communication. However, the scope of the present invention is not limited by this system and standard, but encompasses all types of communication systems to which the following description can be applied.

A UMTS terrestrial radio access network (UTRAN) includes Node Bs configured with a plurality of cells, and a radio network controller (RNC) for managing radio resources of the cells and Node Bs.

Figure 4A:
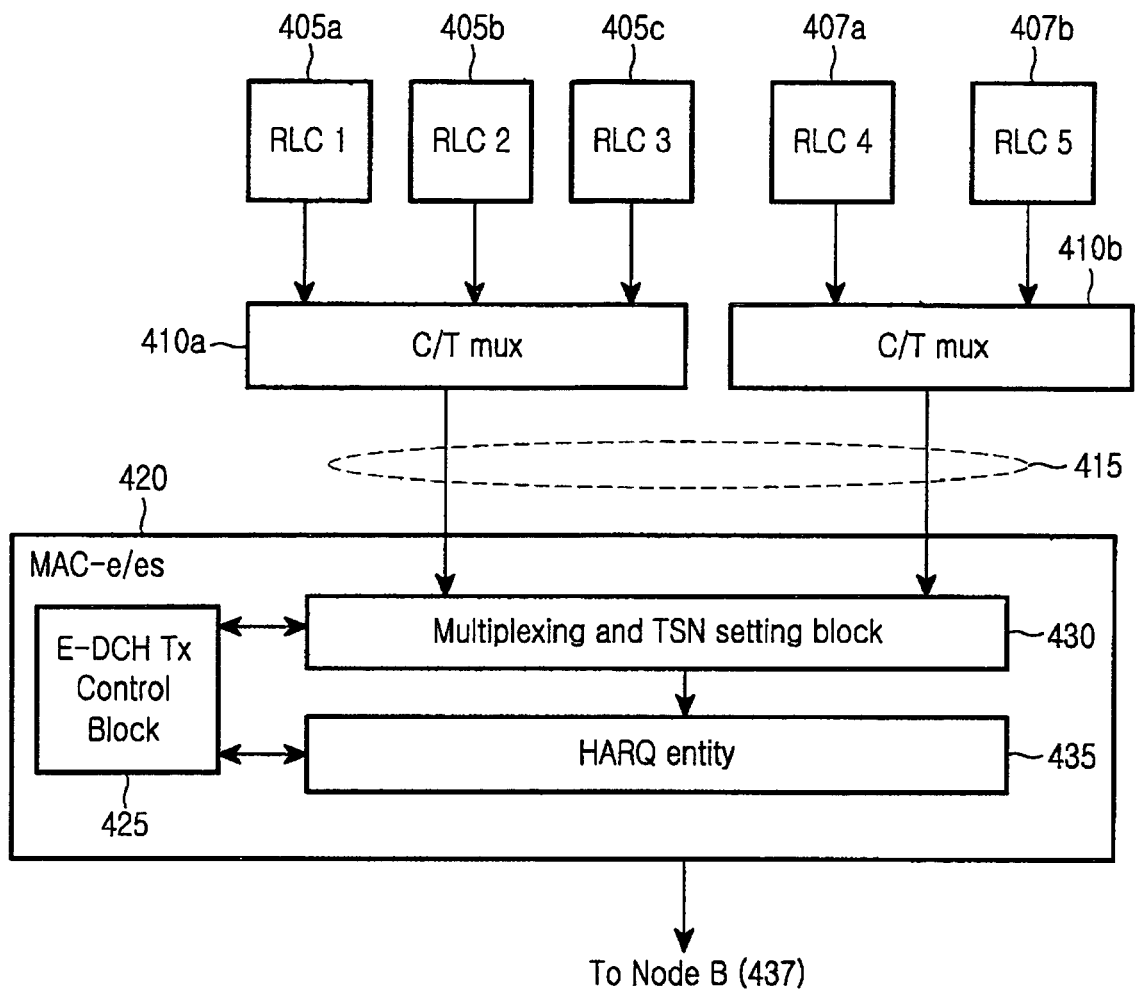
FIGS. 4A and 4B are block diagrams schematically illustrating the structures of a UE, a Node B and an RNC according to an exemplary embodiment of the present invention.
Figure 4B:
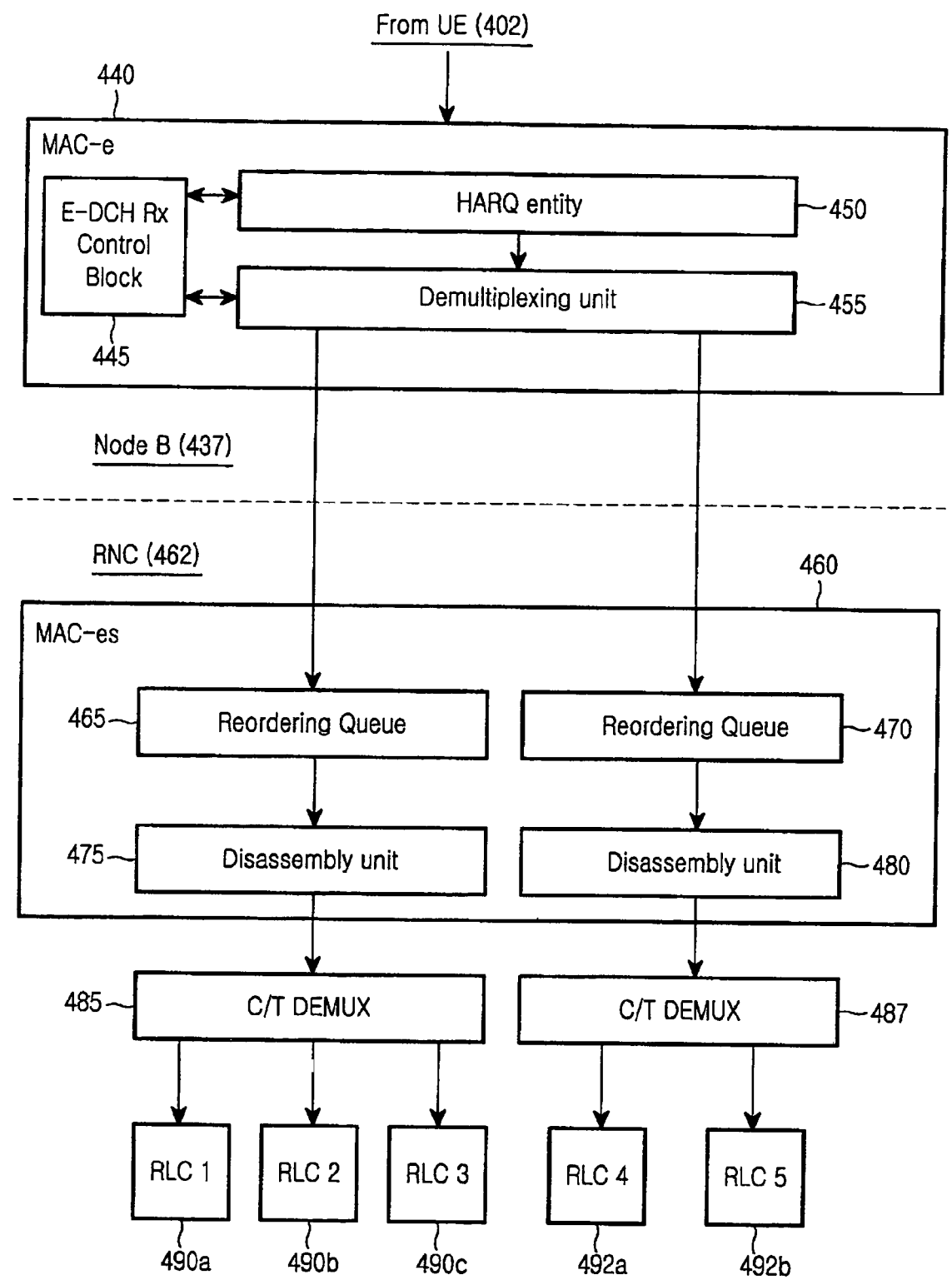

FIGS. 4A and 4B are block diagrams illustrating the structures of a user equipment (UE), a Node B and an RNC for supporting an uplink packet data service according to an embodiment of the present invention.

Referring to FIG. 4A, a UE 402 includes radio link control (RLC) entities 405A to 405C, 407A, and 407B (hereinafter, simply referred to as "405 and 407") of an RLC layer, control an traffic (C/T) multiplexing units 410A and 410B for inserting multiplexing information into data transmitted from the RLC entities 405 and 407, and a Media Access Control for E-DCH/serving RNC (MAC-e/es) layer 420.

The RLC entities 405 and 407 of the RLC layer are configured for each logical channel or radio bearer, store data generated an upper layer, and have a size suitable for a radio layer to transmit the data generated the upper layer. For reference, the radio bearer represents an upper-layer entity and an RLC entity configured to process data of a predetermined application, and the logical channel represents a channel logically-connected between an RLC layer and a MAC layer. One logical channel per one radio bearer is configured.

The C/T multiplexing units 410A and 410B insert multiplexing information into data transmitted from the RLC entities 405 and 407 through logical channels. The multiplexing information may be an identifier of the logical channel, and a receiving side transmits received data to an appropriate receiving-side RLC entity with reference to the identifier. The C/T multiplexing units 410A and 410B are also called "MAC-d" layers.

Data output from each C/T multiplexing unit 410A or 410B is called a "MAC-d PDU", and a series of MAC-d PDUs is called a "MAC-d flow" 415. The MAC-d flow 415 is obtained by classifying logical channels based on requested quality of service (QoS). Data of logical channels requesting the same QoS are classified into the same MAC-d flow 415, and the MAC-e/es layer 420 can provide a specific QoS for each of the MAC-d flows. The QoS may be controlled, for example, by controlling the number of HARQ retransmission or by adjusting the transmission power.

The MAC-e/es layer 420 includes an E-DCH transmission control unit 425, a multiplexing and Transmission Sequence Number (TSN) setting unit 430, and an HARQ entity 435.

The E-DCH transmission control unit 425 manages control information relating to an E-DCH. The control information relating to an E-DCH includes scheduling information, such as a buffer status or an uplink transmission power. The control information is considered when a Node B perform a scheduling, and is piggybacked on a MAC-e PDU, which is an E-DCH packet data, to be transmitted.

The multiplexing and TSN setting unit 430 creates a MAC-e PDU by inserting multiplexing information and a transmission sequence number into data transmitted from an upper layer. The HARQ entity 435 controls the transmission and retransmission of an HARQ of a MAC-e PDU. The HARQ entity 435 controls the transmission and retransmission of a MAC-e PDU based on an acknowledge (ACK) or non-acknowledge (NACK) signal transmitted from a Node B 437.

Referring to FIG. 4B, the Node B 437 includes an HARQ entity 450, a demultiplexing unit 455, an E-DCH reception control unit 445. A MAC-e PDU output from the HARQ entity 435 of a UE 402 is transmitted to the HARQ entity 450 through a physical layer of the UE 402, a radio channel, and a physical layer of the Node B 437. The HARQ entity 450 controls the transmission and retransmission of an HARQ. That is, the HARQ entity 450 creates and transmits an ACK/NACK signal to the UE 402 in response to a MAC-e PDU transmitted through the physical layer, and combines a retransmitted MAC-e PDU with a previously-received and buffered MAC-e PDU.

The demultiplexing unit 455 divides a MAC-e PDU into MAC-es PDUs by using MAC-e PDU header information provided from the HARQ entity 450, and transmits the divided MAC-es PDUs to an RNC 462. When the MAC-e PDU includes MAC-e control information, the MAC-e control information is transmitted to the E-DCH reception control unit 445 by the demultiplexing unit 455. The E-DCH reception control unit 445 receives and processes the MAC-e control information. When the MAC-e control information is included in a MAC-e PDU, the MAC-e control information is transmitted to the E-DCH reception control unit 445, and the E-DCH reception control unit 445 functions to transmit the MAC-e control information to a scheduler (not shown).

The RNC 462 includes reordering queues 465 and 470, disassembly units 475 and 480, C/T demultiplexing units 485 and 487, RLC entities 490A to 490C, 492A and 492B (hereinafter, simply referred to as "490 and 492").

The reordering queues 465 and 470 are configured for each of MAC-d flows in order to reorder the sequence of MAC-es PDUs. The TSN inserted into the multiplexing and TSN setting unit 430 is used to reorder the sequence of the MAC-es PDUs. Each of he disassembly units 475 and 480 disassembles the MAC-es PDUs of a MAC-e flow, which is provided from each of the reordering queues 465 and 470, to RLC PDUs. The C/T demultiplexing units 485 and 487 functions to transmit the RLC PDUs of each MAC-e flow to appropriate RLC entities 490 and 492 of the RLC layer. The RLC entities 490 and 492 reconstructs the provided RLC PDUs to the original upper-layer data, and then transmits the reconstructed data to an upper layer.

As described above, one UE 402 includes a plurality of RLC entities 405 and 407, and one RLC entity corresponds to one logical channel. A plurality of logical channels may correspond to one reordering queue. For instance, RLC #1 to RLC #3 405A to 405C correspond to the reordering queue 465, while RLC #4 and RLC #5 407A and 407 B correspond to the reordering queue 470.

When the UE 402 (see FIG. 4A) is allowed to use an uplink transmission resource from the Node B 437, the UE 402 brings a predetermined amount of data adaptable for the transmission resource from the RLC entities 405 and 407, so as to configure and transmit a MAC-e PDU. The multiplexing and TSN setting unit 430 inserts MAC-e header information into the RLC PDUs transmitted from the RLC entities 405 and 407, thereby generating a MAC-e PDU. In this case, there is control information relating to an E-DCH, the control information is also inserted into the MAC-e PDU, so as to be transmitted with the MAC-e PDU.

Hereinafter, the method for inserting the control information into the MAC-e PDU according to exemplary embodiments of the present invention will be described.

EXEMPLARY EMBODIMENT 1

Figure 5:
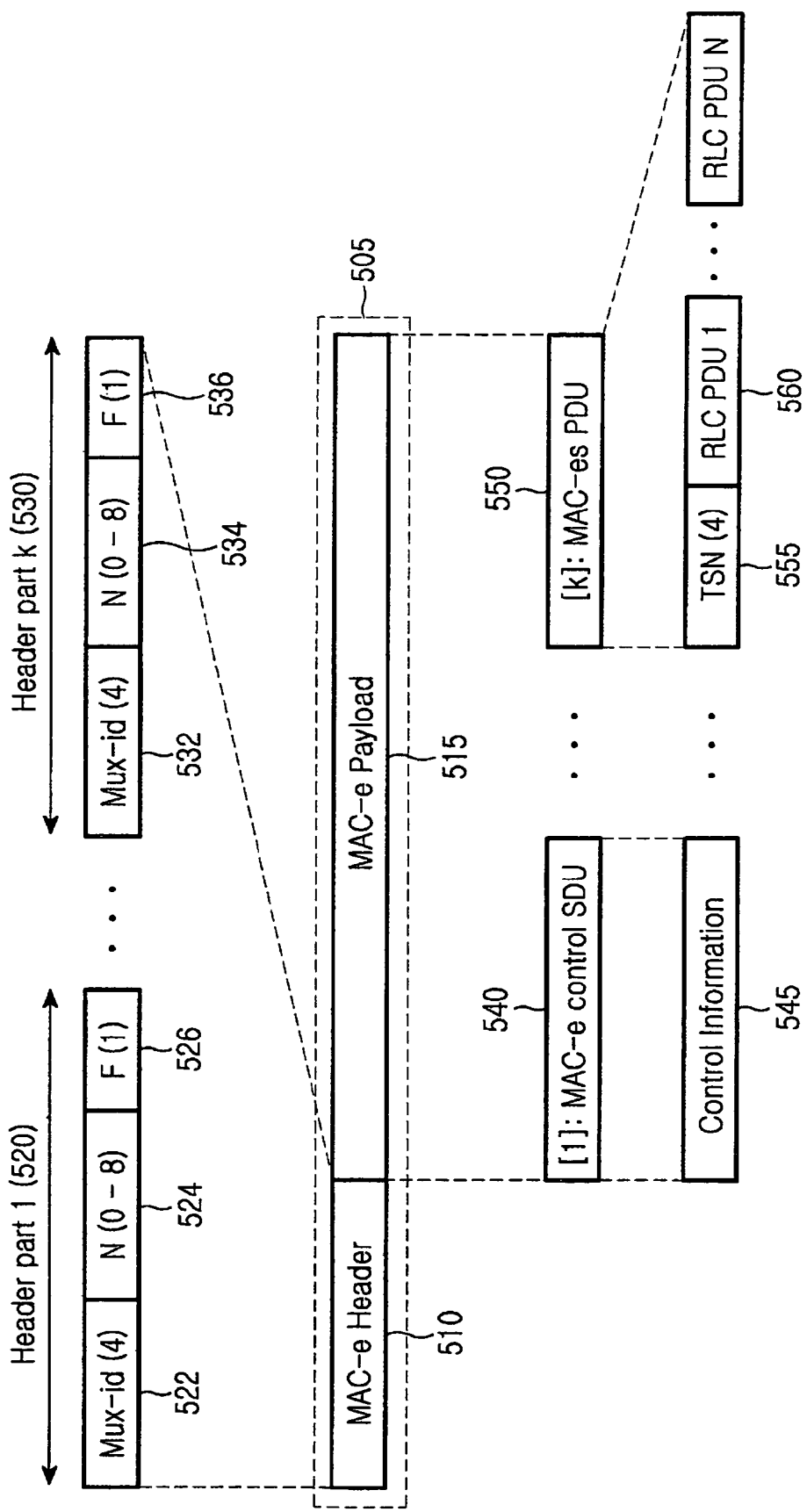
FIG. 5 is a block diagram illustrating the structure of packet data used in an uplink packet data service according to a first exemplary implementation of an embodiment of the present invention.

FIG. 5 is a block diagram illustrating the structure of a MAC-e PDU according to a first exemplary implementation of an embodiment of the present invention. A MAC-e PDU 505 is a data provided through a transmission channel to a physical layer, and includes a MAC-e header 510 and a MAC-e payload 515.

The MAC-e payload 515 of the MAC-e PDU 505 can contain at least one MAC-es PDU 550, and the MAC-e header 510 includes multiplexing information relating to the MAC-es PDU 550. The MAC-e payload 515 can contain RLC PDUs created from a plurality of RLC entities, in which RLC PDUs 560 created from the same RLC entity are contained to be located close to each other in the MAC-e PDU 505. That is, the RLC PDUs 560 and the TSN 555 created from the same RLC entity are contained in one MAC-es PDU 550. The TSN 555 is information used for the reordering of the MAC-es PDU 550. In addition, the MAC-e payload 515 can contain a MAC-e control service data unit (MAC-e control SDU) 540 containing MAC-e control information.

The MAC-e header 510 includes k number of header parts 520 and 530 (herein, "k" is a positive integer), and the header parts 520 and 530 correspond to the data units 540 and 550 included in the MAC-e payload 515 by one-to-one in the sequence of their positions in the MAC-e header 510. That is, a first header part 520 corresponds to the MAC-e control PDU ([1]: MAC-e control SDU) 540, and a $k^{th}$ header part 530 corresponds to a $k^{th}$ MAC-es PDU ([k]: MAC-es PDU) 550. Each header part 520 or 530 includes a multiplexing identifier 522 or 532, an N field 524 or 534 for representing the number of PDUs, and an F field 526 or 536 for representing a flag. The following description will be given with respect to the header part 530 corresponding to the $k^{th}$ MAC-es PDU 550 which contains RLC PDUs.

The multiplexing identifier 532 may be a logical identifier, which is obtained by combining a logical channel identifier, a reordering queue identifier, and PDU size information. The MAC-es PDU 550 contains RLC PDUs 560 of one RLC entity, and the multiplexing identifier 532 may contain information about the size of the RLC PDUs 560 contained in the MAC-es PDU 550. In detail, when RLC PDUs created from RLC #1 405A are contained in the $k^{th}$ MAC-es PDU 550, a logical channel identifier corresponding to RLC #1 405A, an identifier for the reordering queue 465, and a value representing the size of the RLC PDUs 560 contained in the MAC-es PDU 550 are inserted into the multiplexing identifier 532 of a corresponding $k^{th}$ header part 530.

The relationship between the multiplexing identifier and the logical channel, reordering queue, and RLC PDU size is determined by the RNC 462 upon call set-up, and then is reported to the UE 402 and the Node B 437. Table 1 illustrates the relationship between the multiplexing identifier and the logical channel, reordering queue, and RLC PDU size. Herein, the RLC PDU size represents the size of MAC-d PDU input to the MAC-e/es layer 420.

TABLE 1

| Multiplexing Identifier | Logical Channel Identifier | Reordering Queue Identifier | RLC PDU Size |
| --- | --- | --- | --- |
| Mux id 0 | LCH 0 | reordering queue 0 | 336 bit |
| Mux id 1 | LCH 1 | reordering queue 0 | 336 bit |
| Mux id 2 | LCH 2 | reordering queue 1 | 336 bit |
| Mux id 3 | LCH 2 | reordering queue 1 | 168 bit |

The multiplexing and TSN setting unit 430 of the UE 402 stores relationship information as shown in Table 1. When receiving RLC PDUs through a logical channel, the multiplexing and TSN setting unit 430 determines a multiplexing identifier for the RLC PDUs with reference to the identifier of the logical channel. If the logical channel corresponds to a plurality of multiplexing identifiers, the multiplexing and TSN setting unit 430 determines corresponding multiplexing identifiers with reference to the size of the received RLC PDUs. For instance, when receiving RLC PDUs, each of which has a size of 336 bits, through LCH 2, the multiplexing and TSN setting unit 430 configures a MAC-es PDU with the RLC PDUs, and determines a multiplexing identifier as "2." Although the present invention is described with respect to a multiplexing identifier having a size of 4 bits, the scope of the present invention is not limited thereto.

The N field 534 contains information about the number of RLC PDUs 560 contained in the MAC-es PDU 550. The N field 534 may have a variable size of 0 to 8 bits. The F field 536 contains 1-bit information for representing whether the following information is another header part or a MAC-e payload 515, and the F field 536 represents the end of the MAC-e header 510.

When it is determined to transmit a MAC-e control information 545, the MAC-e control information 545 is inserted into the MAC-e payload 515 of the MAC-e PDU 505 by the E-DCH transmission control unit 425 of the UE 402. A special value of a multiplexing identifier is allocated for the MAC-e control SDU 540 containing the MAC-e control information 545. That is, a separate header structure is not used for the MAC-e control information 545. For convenience of description, the special value corresponding to a MAC-e control SDU 540 will be called "Mux_id_control" in the following description.

When the MAC-e control information 545 is generated, the UE 402 inserts the MAC-e control information 545 into the MAC-e control SDU 540 of the MAC-e PDU 505, so as to transmit the MAC-e control information 545. In this case, a multiplexing identifier 522 of the header part 520 corresponding to the MAC-e control SDU 540 is set as the Mux_id_control. When the Node B 437 receives the MAC-e PDU 505, the Node B 437 divides the MAC-e payload 515 of the MAC-e PDU 505 into MAC-es PDUs 550 with reference to the MAC-e header 510. The MAC-es PDU 550 containing RLC PDUs is transmitted to the RNC 462. In contrast, the MAC-e control SDU 540 having the multiplexing identifier 522 of which has been set as the Mux_id_control, is transmitted to the E-DCH transmission control unit 425.

The N field 524 of the header part 520 corresponding to the MAC-e control SDU 540 may coded by one of the following three schemes.

First, the N field 524 contains information about the number of the MAC-e control SDUs 540. In this case, since the N field 524 always has a value of "1", the N field 524 is not needed.

Second, the N field 524 contains information about the size of the MAC-e control SDU 540. In this case, the size of the MAC-e control SDU 540 is determined as a value obtained by multiplying the value of the N field 524 by a predetermined integer. However, when the MAC-e control SDU 540 includes information about its own size, the value of the N field 524 becomes duplicated information.

Third, the N field 524 is not used for the MAC-e control SDU 540. That is, the F field 526 is positioned next to the multiplexing identifier 522 set as the Mux_id_control.

Figure 6:
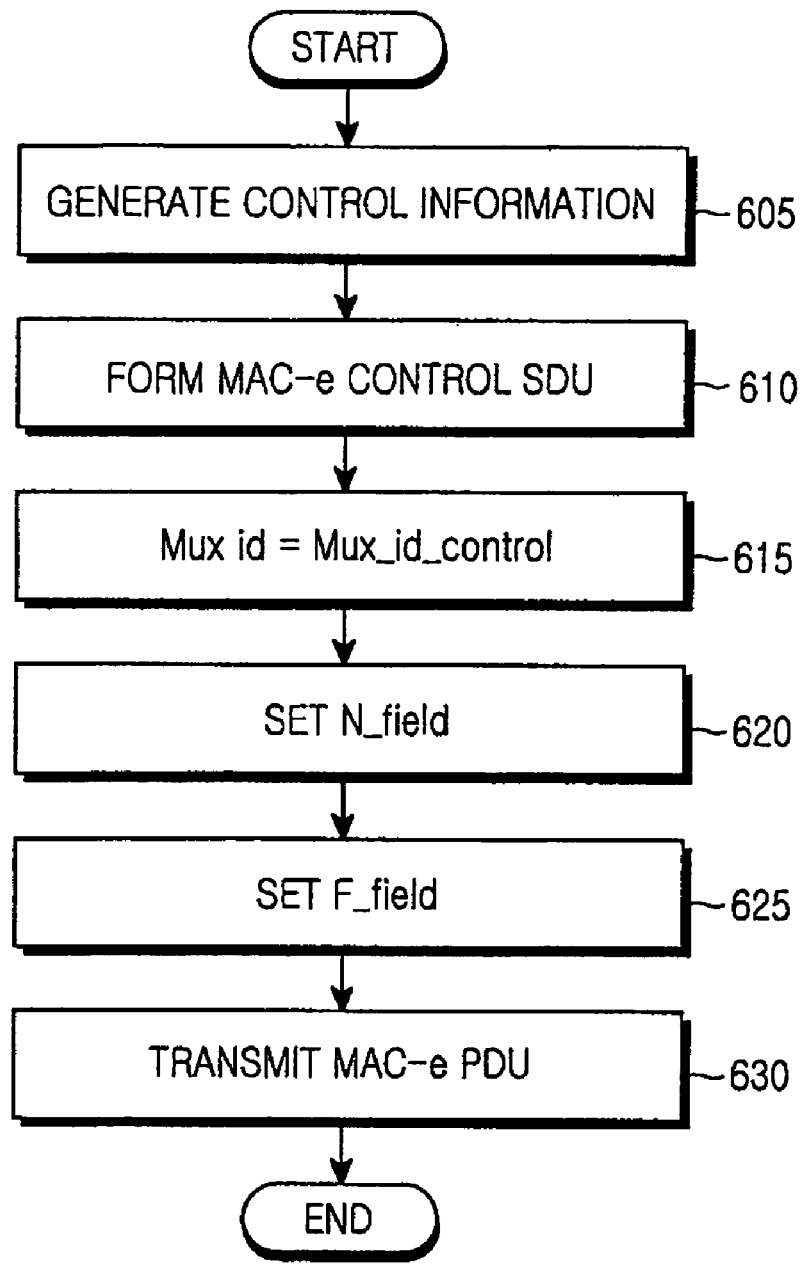
FIG. 6 is a flowchart illustrating the operation of a UE according to the first exemplary implementation of an embodiment of the present invention.

FIG. 6 is a flowchart illustrating the operation of the UE 402 according to the first exemplary implementation of an embodiment of the present invention.

In step 605, the E-DCH transmission control unit 425 of the UE 402 triggers the transmission of MAC-e control information. In step 610, the E-DCH transmission control unit 425 configures a MAC-e control SDU with the MAC-e control information, and transmits the MAC-e control SDU to the multiplexing and TSN setting unit 430.

In step 615, the multiplexing and TSN setting unit 430 sets a multiplexing identifier of a MAC-e header part corresponding to the MAC-e control SDU, as the Mux_id_control which is a predetermined special value. In step 620, the multiplexing and TSN setting unit 430 sets an N field for the MAC-e control SDU. If an N field for the MAC-e control SDU is not used, step 620 is omitted. In step 625, the multiplexing and TSN setting unit 430 sets an F field. If there is a MAC-es PDU which follows to a MAC-e header part corresponding to the MAC-e control SDU, the F field has "1," and if not, then the F field has a "0."

Although it is not shown, MAC-es PDUs including RLC PDUs created from the RLC entities 405 may be transmitted to the multiplexing and TSN setting unit 430. The multiplexing and TSN setting unit 430 sets a multiplexing identifier, an N field, and an F field in each of header parts corresponding to the MAC-es PDUs, based on the size and/or the number of the RLC PDUs. In step 630, the multiplexing and TSN setting unit 430 configures a MAC-e PDU by concatenating the MAC-e header including the MAC-e header parts, the MAC-e control SDU, and the MAC-es PDUs, and then transmits the MAC-e PDU to the Node B 437 through the HARQ entity 435 and logical layer. If there is no MAC-es PDU to be transmitted, a MAC-e PDU including only the MAC-e control SDU is transmitted.

Figure 7:
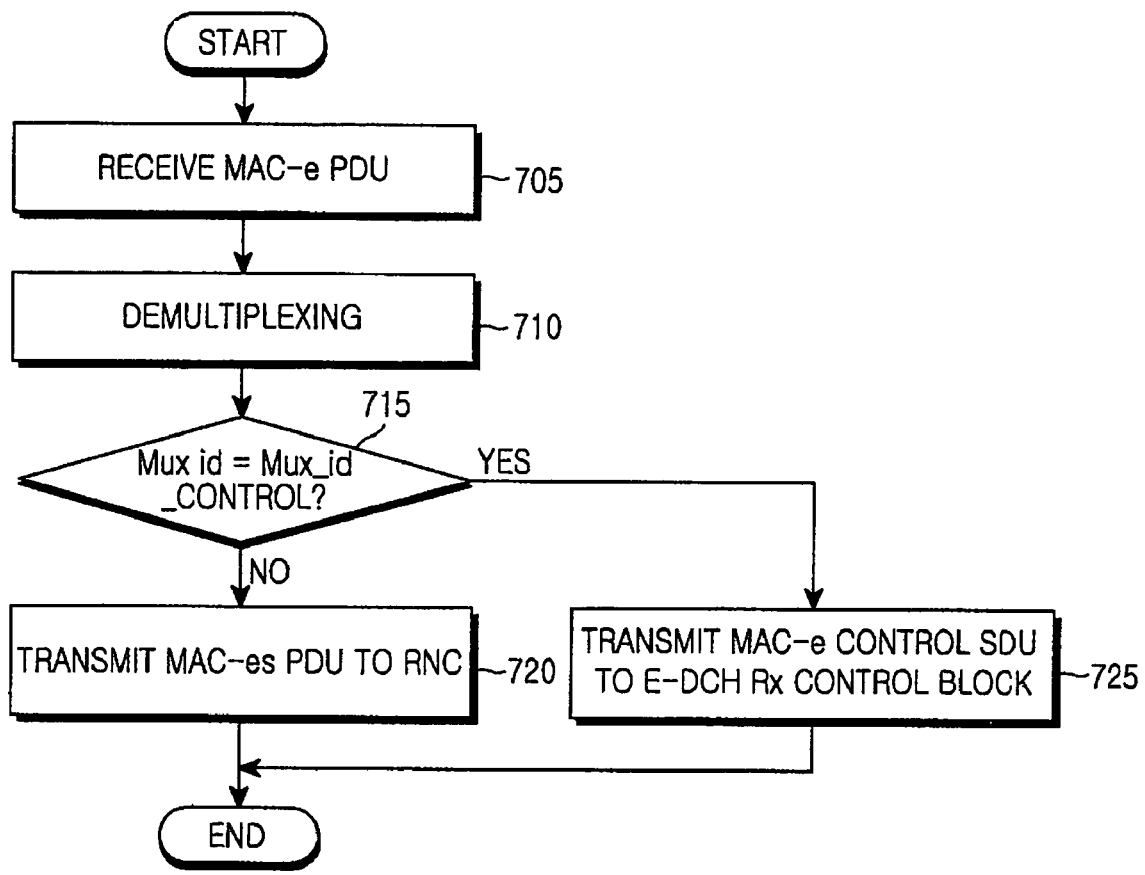
FIG. 7 is a flowchart illustrating the operation of a Node B according to the first exemplary implementation of an embodiment of the present invention.

FIG. 7 is a flowchart illustrating the operation of the Node B 437 according to the first exemplary implementation of an embodiment of the present invention.

In step 705, the Node B 437 receives a MAC-e PDU including a MAC-e header and a MAC-e payload from the UE 402, and inputs the received MAC-e PDU to the demultiplexing unit 455. In step 710, the demultiplexing unit 455 analyzes the MAC-e header of the MAC-e PDU, and divides the MAC-e payload included in the MAC-e PDU into MAC-es PDUs.

The demultiplexing unit 455 checks multiplexing identifiers for each of the MAC-es PDUs. Step 725 is performed if there is a multiplexing identifier having the Mux_id_control which is a predetermined special value, and if not, then step 720 is performed. When a multiplexing identifier is not identical to the Mux_id_control, a relevant MAC-es PDU is a general MAC-es PDU configured with TSN and RLC PDUs. Therefore, in step 720, the general MAC-es PDU is transmitted to the RNC 462. In contrast, when a multiplexing identifier is identical to the Mux_id_control, a relevant MAC-es PDU is a MAC-e control SDU including MAC-e control information. Therefore, in step 725, the MAC-e control SDU is transmitted to the E-DCH reception control unit 445. The E-DCH reception control unit 445 reads control information included in the MAC-e control SDU, and performs appropriate operations such as an operation for transmitting the control information to a scheduler.

EXEMPLARY EMBODIMENT 2

According to the first exemplary implementation of an embodiment of the present invention, a multiplexing identifier included in a MAC-e header of a MAC-e PDU is used to identify a logical channel, a reordering queue, and an RLC PDU size. Different from the first embodiment, the second exemplary implementation of an embodiment of the present invention uses a data description indicator (DDI) in order to identify a MAC-d flow instead of the reordering queue. The combination of a logical channel, a reordering queue, and an RLC PDU size is identical to the combination of a logical channel, a MAC-d flow, and an RLC PDU size, in view that both include information about the size of RLC PDUs contained in a MAC-es PDU and information about an upper layer to which the RLC PDUs will be transmitted. The second exemplary implementation of an embodiment of the present invention uses a DDI, which is a logical identifier for identifying a logical channel, a MAC-d flow, and an RLC PDU size, in order to represent a MAC-e control SDU.

One of the DDI values may take the place of the F field. As described above, the F field acts as a flag for representing whether the following field is a new MAC-e header part or a MAC-e payload. When a predetermined value (for example, "111111") is allocated as a special DDI value, the special DDI value represents the end of a MAC-e header for distinguishing a MAC-e header from a MAC-e payload.

Figure 8:
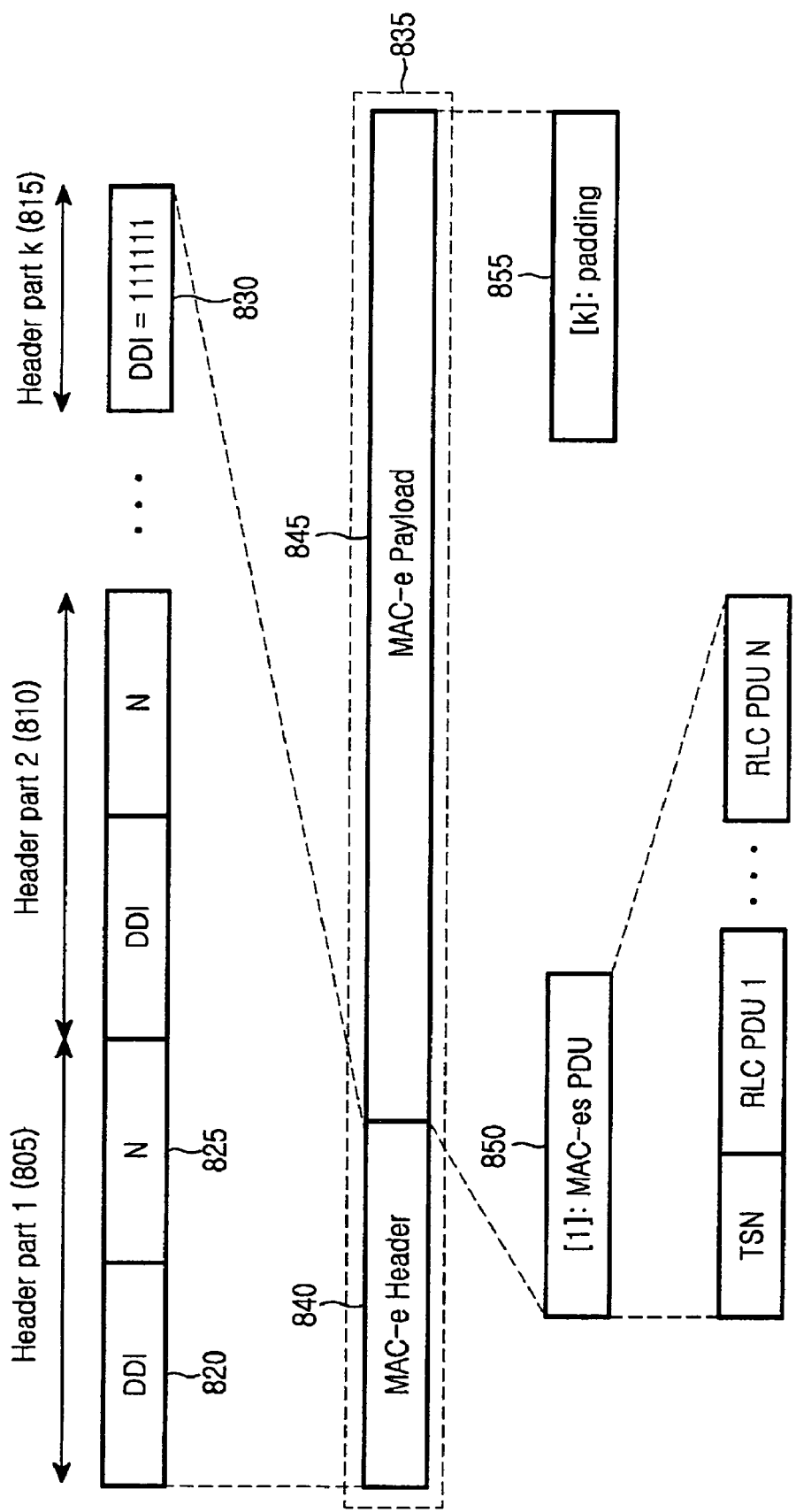
FIG. 8 is a block diagram illustrating the structure of a MAC-e PDU using a DDI.

FIG. 8 is a block diagram illustrating the structure of a MAC-e PDU using a special DDI value. A MAC-e PDU 835 is a data provided through a transmission channel to a physical layer, and includes a MAC-e header 840 and a MAC-e payload 845.

The MAC-e payload 845 of the MAC-e PDU 835 includes MAC-es PDUs 850, each of which contains a TSN and a plurality of RLC PDUs. "k" number of header parts 805, 810, and 815 of the MAC-e header 840 one-to-one correspond to components included in the MAC-e payload 845. The MAC-e header part #1 805 corresponding to a first MAC-es PDU 850 is configured with a DDI field 820 (which represents a logical channel, a reordering queue, and an RLC PDU size) and an N field 825 for representing the number of RLC PDUs. Similarly, the MAC-e header part #2 810 is configured with a DDI field an N field for the next MAC-es PDU. The DDI field 830 of the $k^{th}$ header part 815 (which is the last part) is set as a special DDI value, i.e. "111111", as described above, in order to represent the end of the MAC-e header 840. Predetermined parts of the MAC-e payload corresponding to the special DDI value can be padded with padding bits 855. That is, the special DDI value represents that an RLC PDU may not exist in the predetermined part of the MAC-e payload 845 corresponding to the DDI field 830.

In addition, the special DDI value may be used to represent whether or not there is control information. According to another exemplary embodiment of the present invention, the DDI field 830 may be set as a specific value representing that a predetermined part of the MAC-e payload corresponding to the DDI field 830 is padded, or may be set as another specific value representing that the predetermined portion of the MAC-e payload corresponding to the DDI field 830 is control information. However, the following exemplary description assumes that one special DDI value represents a padding or control information. In this exemplary implementation, padding bits are regarded as a kind of control information.

Figure 9:
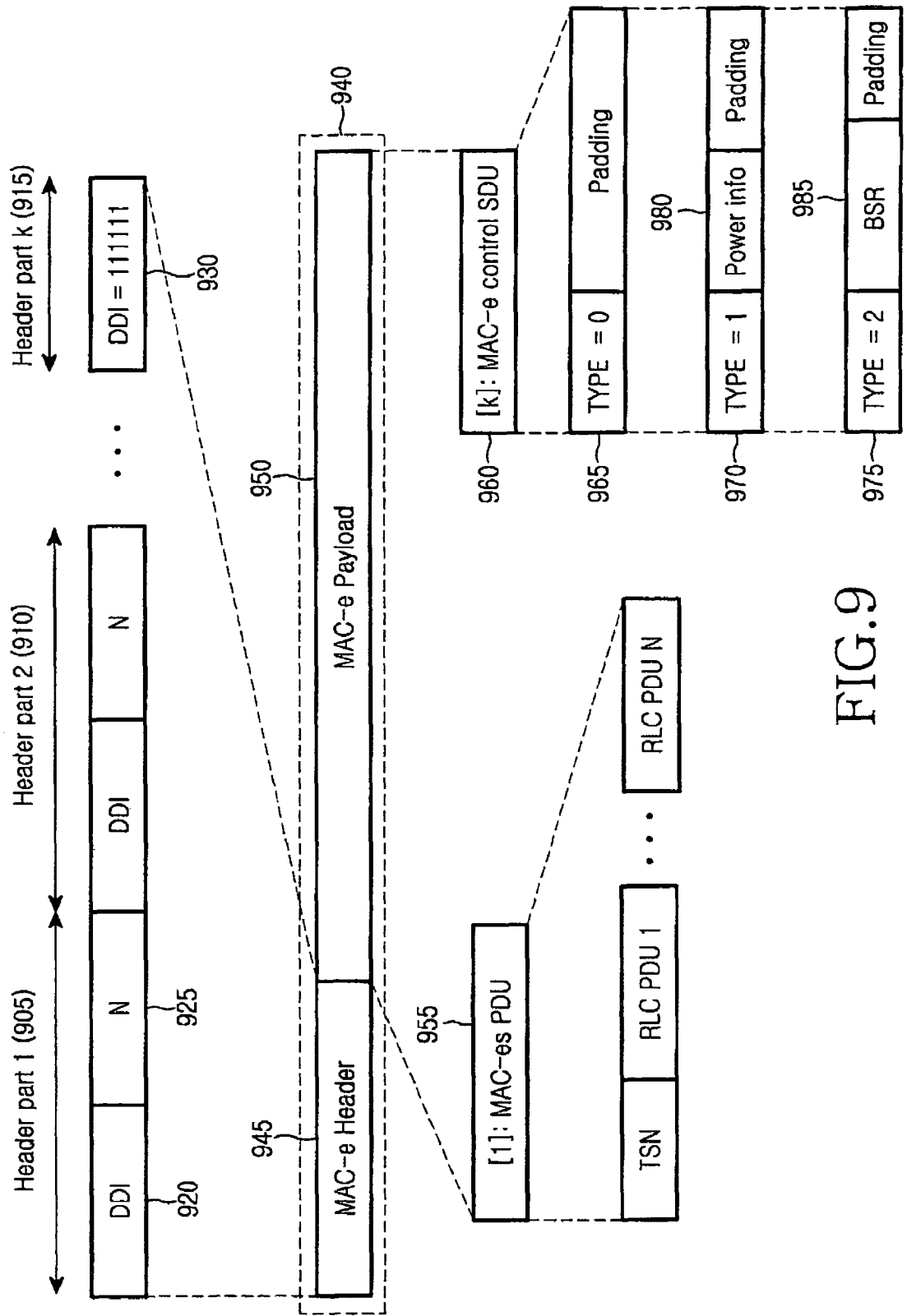
FIG. 9 is a block diagram illustrating the structure of a MAC-e PDU using a DDI according to a second exemplary implementation of an embodiment of the present invention.

FIG. 9 is a block diagram illustrating the structure of a MAC-e PDU according to the second exemplary implementation of an embodiment of the present invention. A MAC-e PDU 940 includes a MAC-e header 945 and a MAC-e payload 950, and the MAC-e header 945 includes k number of header parts 905, 910, and 915. The header parts 905 to 915 one-to-one correspond to components included in the MAC-e payload 950. The MAC-e header part #1 905 corresponding to a first MAC-es PDU 955 is configured with a DDI field 920 (which represents a logical channel, a MAC-d flow, and an RLC PDU size) and an N field 925 for representing the number of RLC PDUs. Similarly, the MAC-e header part #2 910 is configured with a DDI field an N field for the next MAC-es PDU.

The DDI field 930 of the $k^{th}$ header part 915 (which is the last part) is set as a special DDI value, e.g. "111111", in order to represent that a relevant portion in the MAC-e payload contains a MAC-e control SDU 960. The N field of the last header part 915 is not used.

The special DDI value represents a MAC-e control SDU which includes padding bits or MAC-e control information. The MAC-e control information is scheduling information used as a reference when the scheduler of the Node B performs scheduling. For instance, the MAC-e control information includes power information about a transmission power margin of a UE, or buffer status information of the UE. The transmission power margin represents the maximum available transmission power of a UE. A UE, which makes communication through a dedicated channel, always transmits pilot bits, a transport format combination indicator (TFCI), or the like through a dedicate physical control channel (DPCCH). Therefore, an available transmission power of a UE is obtained by subtracting the transmission power for the DPCCH from the total transmission power. Since the DPCCH is power controlled, the transmission power margin becomes smaller as the radio channel environment of the UE becomes more poor. Therefore, the scheduler of the Node B estimates the radio channel environment of the UE by using the transmission power margin. The buffer status information of a UE represents the amount of data stored in the buffer of the UE.

The structure of the MAC-e control SDU 960, into which MAC-e control information is inserted, will now be described.

Type fields 965, 970, and 975 are inserted into the MAC-e control SDU 960. The type fields 965, 970, and 975 represent kinds of control information inserted into the MAC-e control SDU 960. For instance, type 0 may represent padding, type 1 represent power information, and type 2 represent buffer status information. The MAC-e control SDU 960 is configured with the remaining portion of the MAC-e PDU 940, except for the MAC-e header 945 and MAC-es PDUs, so the size of the MAC-e control SDU 960 is variable. Since control information has a predetermined size, the remaining portion of the MAC-e control SDU 960, after the type information and the control information are inserted into the MAC-e control SDU 960, may be filled with padding bits.

Padding bits are inserted into a 0-type MAC-e control SDU 965.

Power information 980 (and padding bits if it is required) is inserted into a 1-type MAC-e control SDU 970.

A buffer status report (BSR) 985 representing a buffer status (and padding bits if it is required) is inserted into a 2-type MAC-e control SDU 975.

Although only three forms of type are disclosed above, more forms of type may be used according to the kinds of control information inserted into the MAC-e control SDU 960. For instance, a new type for representing control information including both of the power information and the buffer status information may be added.

As described above, the second exemplary embodiment uses one of DDI values in order to represent whether or not control information is included. Since the second exemplary embodiment additionally uses an N field and an F field, differently from the first exemplary embodiment, it is possible to prevent waste of transmission resources.

The system, to which the second embodiment of the present invention is applied to, has the same structure as the system shown in FIGS. 4A and 4B. The operations of the UE 402 and the Node B 437 will now be described with reference to FIGS. 4A and 4B.

Figure 10:
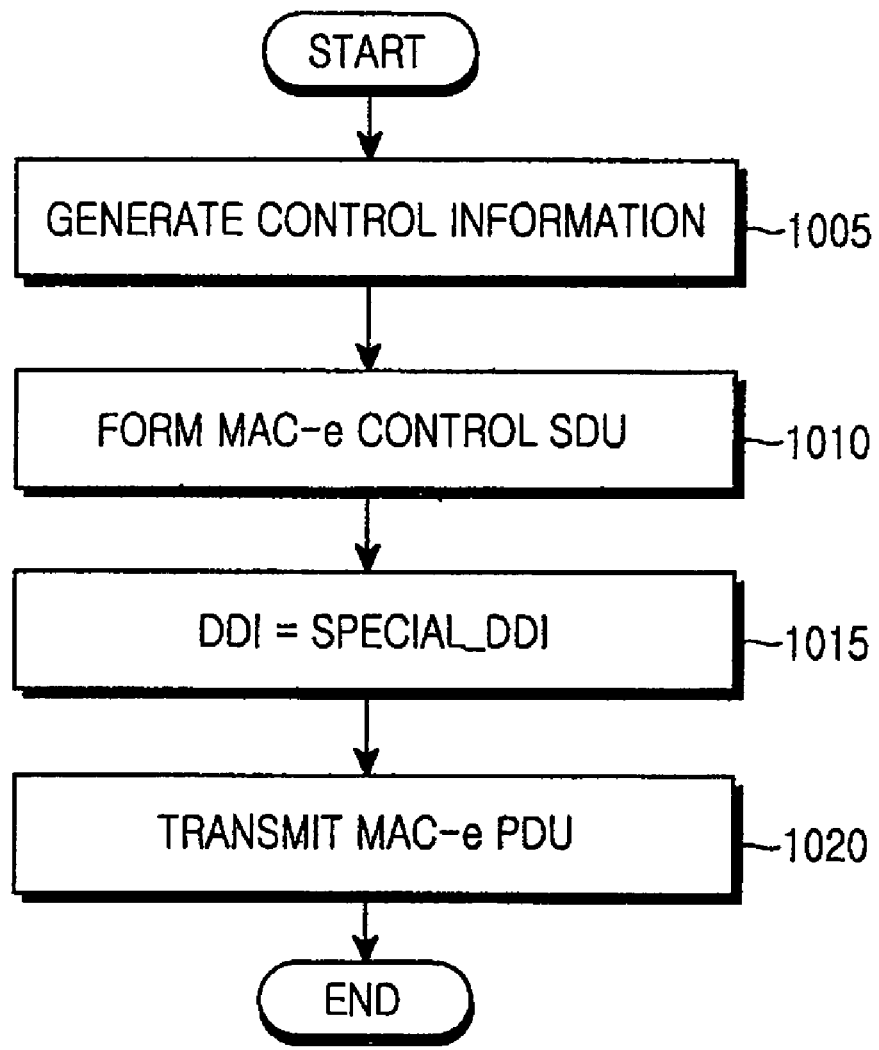
FIG. 10 is a flowchart illustrating the operation of a UE according the second exemplary implementation of an embodiment of the present invention.

FIG. 10 is a flowchart illustrating the operation of the UE 402 according the second exemplary implementation of an embodiment of the present invention.

In step 1005, the E-DCH transmission control unit 425 of the UE 402 triggers the transmission of MAC-e control information. In step 1010, the E-DCH transmission control unit 425 configures a MAC-e control SDU with the MAC-e control information, and transmits the MAC-e control SDU to the multiplexing and TSN setting unit 430. In this case, the MAC-e control SDU includes type information and control information as shown in FIG. 9. The MAC-e control SDU may be configured with information other than the above-mentioned information. In step 1015, the multiplexing and TSN setting unit 430 sets the value of a DDI field of a MAC-e header part corresponding to the MAC-e control SDU as a predetermined value, i.e. as a special DDI value.

Although it is not shown, MAC-es PDUs including RLC PDUs created from the RLC entities 405 may be transmitted to the multiplexing and TSN setting unit 430. The multiplexing and TSN setting unit 430 sets a multiplexing identifier, a DDI field, and an N field for each of header parts corresponding to the MAC-es PDUs, based on the size and the number of the RLC PDUs. A header part corresponding to the MAC-e control SDU is configured as a DDI field. In step 1020, the multiplexing and TSN setting unit 430 configures a MAC-e PDU by concatenating the MAC-e header including the MAC-e header parts, the MAC-es PDUs, and the MAC-e control SDU, and then transmits the MAC-e PDU to the Node B 437 through the HARQ entity 435 and logical layer. If there is no MAC-es PDU to be transmitted, a MAC-e PDU including only the MAC-e control SDU is transmitted.

Figure 11:
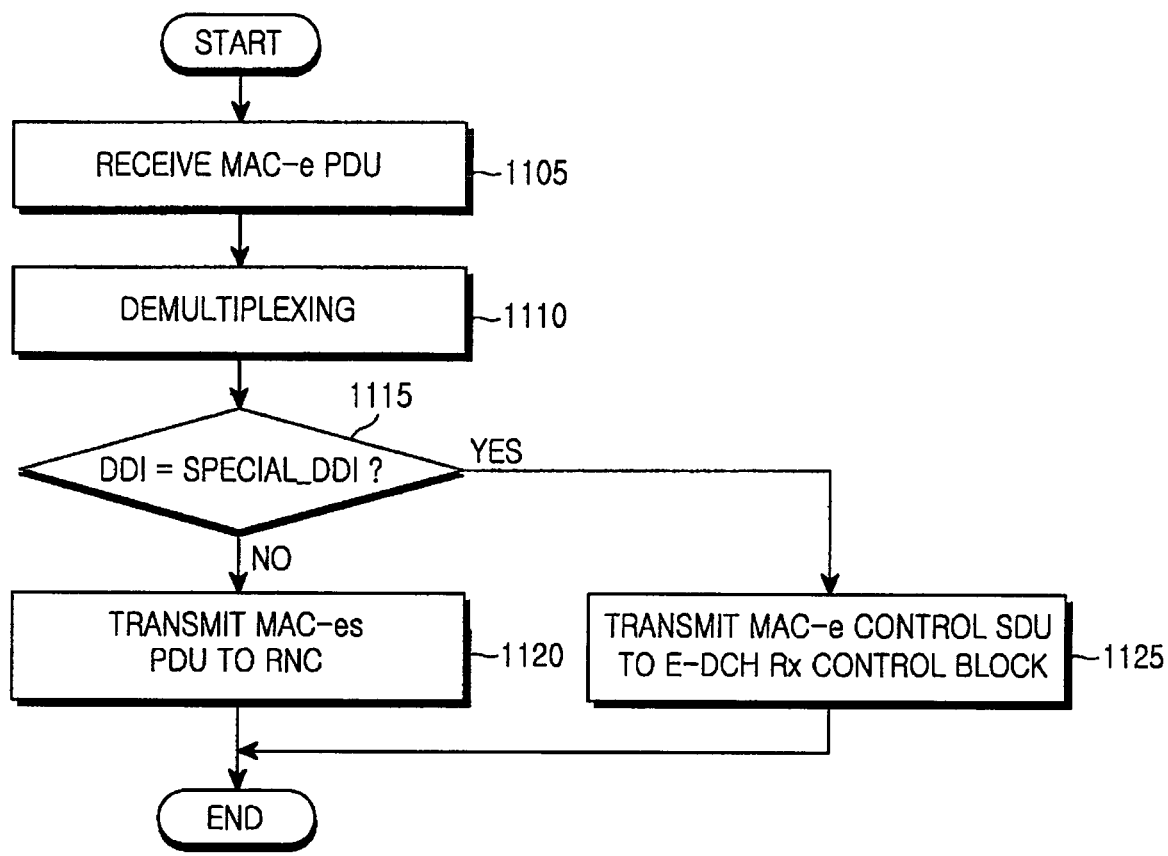
FIG. 11 is a flowchart illustrating the operation of a Node B according to the second exemplary implementation of an embodiment of the present invention.

FIG. 11 is a flowchart illustrating the operation of the Node B 437 according to the second exemplary implementation of an embodiment of the present invention.

In step 1105, the Node B 437 receives a MAC-e PDU including a MAC-e header and a MAC-e payload from the UE 402, and inputs the received MAC-e PDU to the demultiplexing unit 455. In step 1110, the demultiplexing unit 455 analyzes the MAC-e header of the MAC-e PDU, and divides the MAC-e payload included in the MAC-e PDU into MAC-es PDUs.

The demultiplexing unit 455 checks DDI fields for each of the MAC-es PDUs. Step 1125 is performed if there is a DDI field having a special DDI value, and if not, then step 1120 is performed. When a DDI field is not identical to the special DDI value, a relevant MAC-es PDU is a general MAC-es PDU configured with TSN and RLC PDUs. Therefore, in step 1120, the MAC-es PDU is transmitted to the RNC 462. In contrast, when a DDI field is identical to the special DDI value, a relevant MAC-es PDU is a MAC-e control SDU including MAC-e control information. Therefore, in step 1125, the MAC-e control SDU is transmitted to the E-DCH reception control unit 445. The E-DCH reception control unit 445 reads MAC-e control information included in the MAC-e control SDU based on a type value included in the MAC-e control SDU, and performs appropriate operations such as an operation for transmitting the control information to a scheduler.

EXEMPLARY EMBODIMENT 3

According to the first exemplary embodiment, a special DDI value representing a MAC-e control SDU is used for a DDI field, and an N field relating to the DDI field is used to represent a kind of control information inserted into the MAC-e control SDU.

Figure 12:
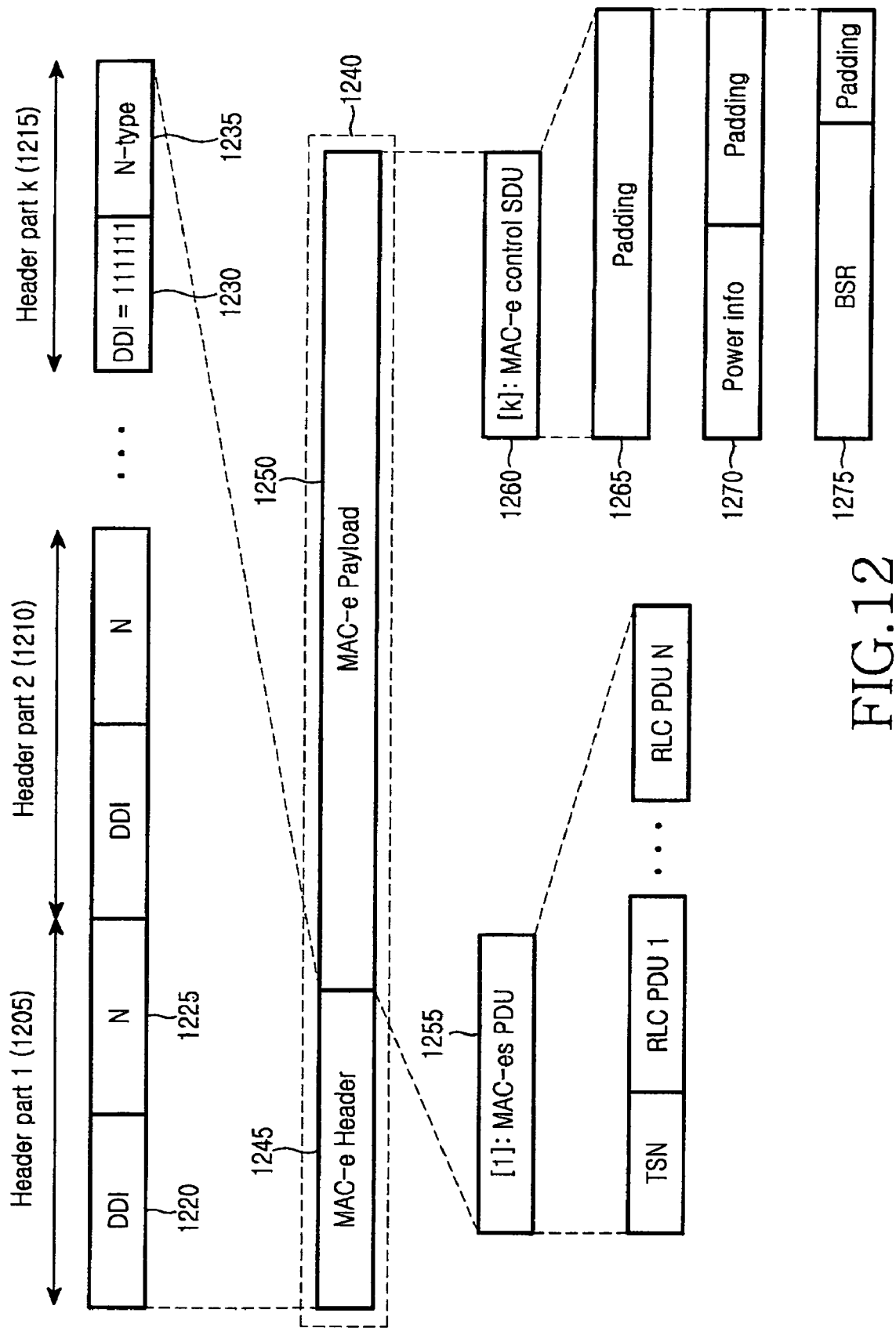
FIG. 12 is a block diagram illustrating the structure of a MAC-e PDU according to a third exemplary implementation of an embodiment of the present invention.

FIG. 12 is a block diagram illustrating the structure of a MAC-e PDU according to the third exemplary implementation of an embodiment of the present invention. A MAC-e PDU 1240 includes a MAC-e header 1245 and a MAC-e payload 1250, and the MAC-e header 1245 includes k number of header parts 1205, 1210, and 1215. The header parts 1205 to 1215 one-to-one correspond to components included in the MAC-e payload 1250. The MAC-e header part #1 1205 corresponding to a first MAC-es PDU 1255 is configured with a DDI field 1220 (which represents a logical channel, a MAC-d flow, and an RLC PDU size) and an N field 1225 for representing the number of RLC PDUs. The MAC-e header part #2 1210 is configured with a DDI field an N field for the next MAC-es PDU.

Similarly, the $k^{th}$ header part 1215 (which is the last part) is configured with a DDI field 1230 an N field 1235. The DDI field 1230 is set as a special DDI value, e.g. "111111", in order to represent that a relevant portion in the MAC-e payload contains a MAC-e control SDU 1260. The special DDI value represents a MAC-e control SDU including MAC-e control information. The MAC-e control information represents power information of a UE, buffer status information of the UE, and so on. The N field 1235 of the $k^{th}$ header part 1215 represents kinds of the MAC-e control information. For instance, predetermined values, for example, as "0" for padding, "1": for power information, "2" for buffer status information, and so on, may be used as values of N field 1235 relating to the DDI field 1230.

MAC-e control information is inserted into the MAC-e control SDU 1260, except for a type field. For instance, in the case of type 0, padding bits are inserted into the MAC-e control SDU 1260. In the case of type 1, power information 1270 (and padding bits if it is required) is inserted into the MAC-e control SDU 1260. In the case of type 2, a buffer status report (BSR) 1275 for representing a buffer status (and padding bits if it is required) is inserted into the MAC-e control SDU 1260. Although not disclosed herein, more forms of types may be used.

The system, to which the third exemplary implementation of an embodiment of the present invention is applied, has the same structure as the system shown in FIGS. 4A and 4B. The operations of the UE 402 and the Node B 437 will now be described with reference to FIGS. 4A and 4B.

Figure 13:
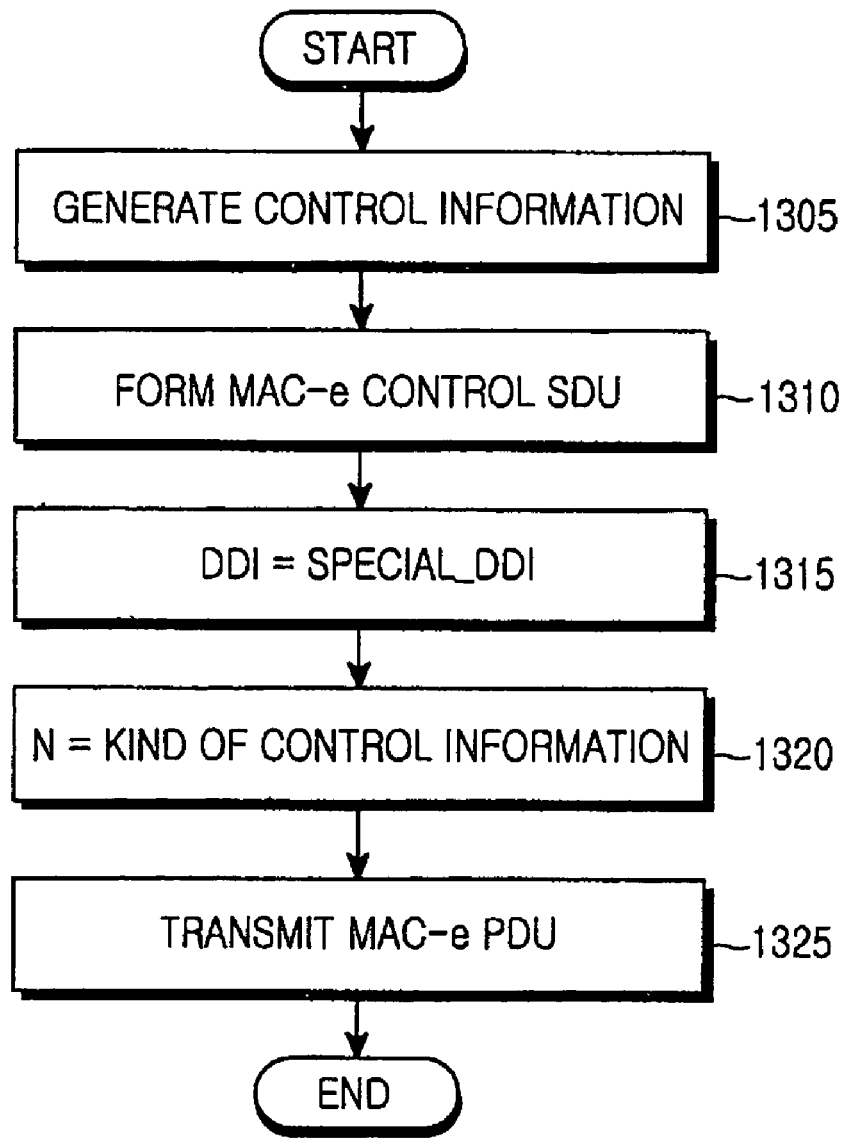
FIG. 13 is a flowchart illustrating the operation of a UE according the third exemplary implementation of an embodiment of the present invention.

FIG. 13 is a flowchart illustrating the operation of the UE 402 according the third exemplary implementation of an embodiment of the present invention.

In step 1305, the E-DCH transmission control unit 425 of the UE 402 triggers the transmission of MAC-e control information. In step 1310, the E-DCH transmission control unit 425 configures a MAC-e control SDU with the MAC-e control information, and transmits the MAC-e control SDU to the multiplexing and TSN setting unit 430. In step 1315, the multiplexing and TSN setting unit 430 sets the value of a DDI field of a MAC-e header part corresponding to the MAC-e control SDU as a special DDI value. In step 1320, the multiplexing and TSN setting unit 430 sets the value of an N field of a MAC-e header part corresponding to the MAC-e control SDU, as a value representing a kind of control information included in the MAC-e control SDU. The kinds of the MAC-e control SDUs and corresponding values of the N field have already been made known to the Node B and EUs.

Although it is not shown, MAC-es PDUs including RLC PDUs created from the RLC entities 405 may be transmitted to the multiplexing and TSN setting unit 430. The multiplexing and TSN setting unit 430 sets a DDI field and an N field in each of header parts corresponding to the MAC-es PDUs, based on the size and/or the number of the RLC PDUs. In step 1325, the multiplexing and TSN setting unit 430 configures a MAC-e PDU by concatenating the MAC-e header including the MAC-e header parts, the MAC-es PDUs, and the MAC-e control SDU, and then transmits the MAC-e PDU to the Node B 437 through the HARQ entity 435 and logical layer. If there is no MAC-es PDU to be transmitted, a MAC-e PDU including only the MAC-e control SDU is transmitted.

Figure 14:
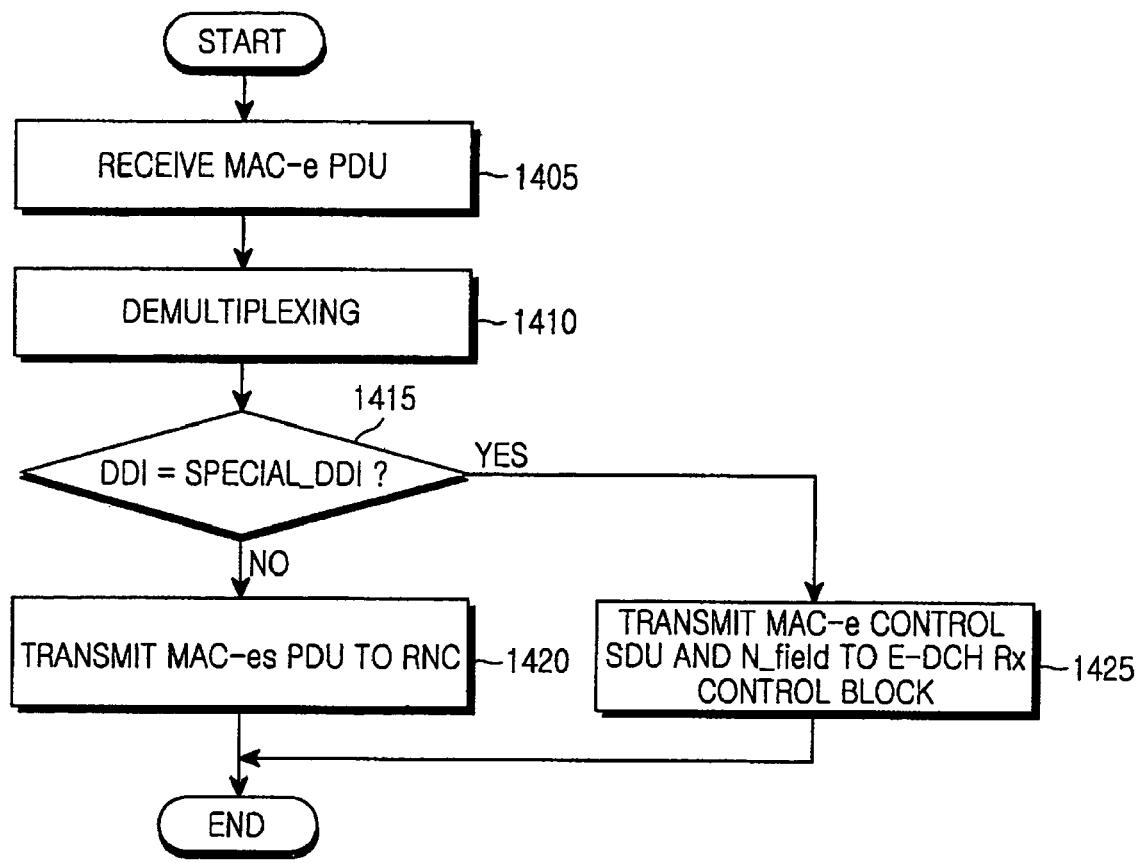
FIG. 14 is a flowchart illustrating the operation of a Node B according to the third exemplary implementation of an embodiment of the present invention.

FIG. 14 is a flowchart illustrating the operation of the Node B 437 according to the third exemplary implementation of an embodiment of the present invention.

In step 1405, the Node B 437 receives a MAC-e PDU including a MAC-e header and a MAC-e payload from the UE 402, and inputs the received MAC-e PDU to the demultiplexing unit 455. In step 1410, the demultiplexing unit 455 analyzes the MAC-e header of the MAC-e PDU, and divides the MAC-e payload included in the MAC-e PDU into MAC-es PDUs.

The demultiplexing unit 455 checks DDI fields for each of the MAC-es PDUs. Step 1425 is performed if there is a DDI field having a special DDI value, and if not, then step 1420 is performed. When a DDI field is not identical to the special DDI value, a relevant MAC-es PDU is a general MAC-es PDU configured with TSN and RLC PDUs. Therefore, in step 1420, the MAC-es PDU is transmitted to the RNC 462. In contrast, when a DDI field is identical to the special DDI value, a relevant MAC-es PDU is a MAC-e control SDU including MAC-e control information. Therefore, in step 1425, the MAC-e control SDU is transmitted to the E-DCH reception control unit 445. In this case, the demultiplexing unit 455 reads the value of an N field corresponding to the MAC-e control SDU, and determines if the MAC-e control SDU includes effective MAC-e control information, such as power information or a buffer status report. If the MAC-e control SDU includes the effective MAC-e control information, this is notified to the E-DCH reception control unit 445. The E-DCH reception control unit 445 checks MAC-e control information included in the MAC-e control SDU, and performs appropriate operations, such as an operation for transmitting the control information to a scheduler.

Some effects of the present invention, the exemplary effects obtained by the above-mentioned exemplary embodiments, will now be described.

According to exemplary implementations of an the present invention, since the same header parts are used for packet data and MAC-e control information, the header structure of MAC-e PDUs may be formed with consistency, so that a UE and a Node B may simply transmit/receive MAC-e control information, such as power information and buffer status information, through a MAC-e PDU. In addition, since a supplementary header structure is not required for MAC-e control information, the MAC-e control information can be transmitted without increasing the size of the MAC-e header.

While the present invention has been shown and described with reference to certain exemplary embodiments thereof, it will be understood by those skilled in the art that various changes in form and details may be made therein without departing from the spirit and scope of the invention as defined by the appended claims and the equivalents thereof.

What is claimed is:

1. A method for transmitting control information for an uplink packet data service in a mobile communication system, the method comprising the steps of:
   forming a first protocol data unit (PDU) including uplink packet data;
   forming a control service data unit (SDU) including control information for an uplink packet data service;
   forming at least one first header part corresponding to the first PDU by using a data description indicator (DDI) field representing the first PDU and an N field representing the number of uplink packet data included in the first PDU;
   forming a second header part corresponding to the control SDU by using a DDI field set as a predetermined specific value representing that the control SDU is transmitted; and
   forming a second data packet unit (PDU) by concatenating a header and a payload, and transmitting the second PDU to a Node B, wherein the header includes the header parts, and the payload includes the first PDU and the control SDU.

2. The method as claimed in claim 1, wherein, the control SDU is formed by using a type value representing a type of the control information included in the control SDU and the control information by using padding bits which are selectively used if necessary.

3. The method as claimed in claim 2, wherein the type value represents any one of transmission power information of a user equipment (UE) to transmit the uplink packet data service, buffer status information thereof, and padding.

4. The method as claimed in claim 1, wherein the control information includes at least one of transmission power information of a UE to transmit the uplink packet data service and buffer status information thereof.

5. The method as claimed in claim 1, wherein the second header part corresponding to the control SDU further includes a type value representing a kind of the control information included in the control SDU.

6. The method as claimed in claim 1, wherein the DDI field inserted into the first header part represents a media access control-data (MAC-d) flow and a logical channel relating to uplink packet data included in the first PDU, and a size of the uplink packet data.

7. A method for receiving control information for an uplink packet data service in a mobile communication system, the method comprising the steps of:
   receiving a first protocol data unit (PDU) formed by using a header and a payload;
   demultiplexing the payload into a plurality data units, based on header parts included in the header;
   dividing the data units into a second PDU including uplink packet data and a control service data unit (SDU) including control information for an uplink packet data service, based on data description indicator (DDI) fields of the header parts corresponding to the data units, wherein a DDI field of a header part corresponding to the control SDU has been set as a predetermined specific value; and
   acquiring the control information from the control SDU.

8. The method as claimed in claim 7, wherein, the control SDU includes a type value representing a kind of the control information contained in the control SDU, the control information, and padding bits which are selectively used if necessary.

9. The method as claimed in claim 8, wherein the type value represents any one of transmission power information of a user equipment (UE) transmitting the uplink packet data service, buffer status information thereof, and padding.

10. The method as claimed in claim 7, wherein the control information includes at least one of transmission power information of a UE transmitting the uplink packet data service and buffer status information thereof.

11. The method as claimed in claim 7, wherein a header part corresponding to the control SDU further includes a type value representing a kind of the control information contained in the control SDU.

12. The method as claimed in claim 7, wherein the DDI field of a header part corresponding to the second PDU represents a media access control-data (MAC-d) flow and a logical channel relating to uplink packet data included in the second PDU, and a size of the uplink packet data.

13. A user equipment (UE) for transmitting control information for an uplink packet data service in a mobile communication system, the UE comprising:
   at least one block for forming a first protocol data unit (PDU) including uplink packet data;
   a control unit for forming a control service data unit (SDU) including control information for an uplink packet data service; and a multiplexing and transmission sequence number (TSN) setting unit for forming at least one first header part corresponding to the first PDU by using a data description indicator (DDI) field representing the first PDU and an N field representing the number of uplink packet data included in the first PDU, forming a second header part corresponding to the control SDU by using a DDI field set as a predetermined specific value representing that the control SDU is transmitted, and forming a second data packet unit (PDU) by concatenating a header and a payload, the header including the header parts, the payload including the first PDU and the control SDU, wherein the second PDU is transmitted to a Node B.

14. The user equipment as claimed in claim 13, wherein the control unit forms the control SDU by using a type value representing a kind of the control information included in the control SDU, the control information, and padding bits which are selectively used if necessary.

15. The user equipment as claimed in claim 14, wherein the type value represents any one of transmission power information of the UE to transmit the uplink packet data service, buffer status information thereof, and padding.

16. The user equipment as claimed in claim 13, wherein the control information includes at least one of transmission power information of the UE to transmit the uplink packet data service and buffer status information thereof.

17. The user equipment as claimed in claim 13, wherein the second header part corresponding to the control SDU further includes a type value representing a kind of the control information included in the control SDU.

18. The user equipment as claimed in claim 13, wherein the DDI field inserted into the first header part represents a media access control-data (MAC-d) flow and a logical channel relating to uplink packet data included in the first PDU, and a size of the uplink packet data.

19. A Node B for receiving control information for an uplink packet data service in a mobile communication system, the Node B comprising:

a demultiplexing unit for receiving a first protocol data unit (PDU) formed by using a header and a payload, demultiplexing the payload into a plurality data units based on header parts included in the header, and dividing the data units into a second PDU and a control service data unit (SDU) based on data description indicator (DDI) fields of the header parts corresponding to the data units, the second PDU including uplink packet data, the control SDU including control information for an uplink packet data service, wherein a DDI field of a header part corresponding to the control SDU has been set as a predetermined specific value; and a control unit for acquiring the control information from the control SDU.

20. The Node B as claimed in claim 19, wherein the control SDU includes a type value representing a kind of the control information contained in the control SDU, the control information, and padding bits which are selectively used if necessary.

21. The Node B as claimed in claim 20, wherein the type value represents any one of transmission power information of a user equipment (UE) transmitting the uplink packet data service, buffer status information thereof, and padding.

22. The Node B as claimed in claim 19, wherein the control information includes at least one of transmission power information of a UE transmitting the uplink packet data service and buffer status information thereof.

23. The Node B as claimed in claim 19, wherein a header part corresponding to the control SDU further includes a type value representing a kind of the control information contained in the control SDU.

24. The Node B as claimed in claim 19, wherein the DDI field of a header part corresponding to the second PDU represents a media access control-data (MAC-d) flow and a logical channel relating to uplink packet data included in the second PDU, and a size of the uplink packet data.

* * * * *